United States Patent Office 3,699,095
Patented Oct. 17, 1972

3,699,095
PROCESS FOR REACTING UNGELATINIZED STARCH WITH A MIXED CARBONIC-CARBOXYLIC ANHYDRIDE OF A POLYCARBOXYLIC ACID
Martin Melvyn Tessler, Edison, and Morton Wolf Rutenberg, North Plainfield, N.J., assignors to National Starch and Chemical Corporation, New York, N.Y.
No Drawing. Filed Sept. 2, 1970, Ser. No. 69,122
Int. Cl. C13l 1/08
U.S. Cl. 260—233.5    6 Claims

ABSTRACT OF THE DISCLOSURE

Inhibited, granular starch derivatives crosslinked by labile ester linkages resulting from the reaction of starch with various mixed carbonic-carboxylic anhydrides of polycarboxylic acids are described; said inhibited starch derivatives display utility in food products and other industrial applications.

---

This invention relates to a novel method for the preparation of inhibited, granular starch products and to the inhibited starch products obtained thereby.

In our use of the term "inhibited starch," we refer to a starch in which the disintegration of the starch granules is retarded under conditions whereby the intact starch granules would ordinarily swell and burst. Thus, inhibited starches exhibit a markedly reduced tendency to gelatinize and also display a comparatively short, non-cohesive consistency after cooking. The degree of inhibition can be controlled and varied over a wide range so as to produce starch products in which the swelling of the granules is only slightly retarded, and through successive stages to starch products in which the swelling of the granules is so highly retarded or inhibited that, on cooking in a boiling water bath, the granules cannot remain suspended in water but will, rather, settle out as a separate phase.

It is well known that starch may be inhibited, while in granular form, by reaction with polyfunctional reagents, such as epichlorohydrin, phosphorus oxychloride, vinyl sulfone, etc., which crosslink the starch molecules within the granule. This reaction results in the formation of covalent chemical linkages between the molecules, thereby adding to the bonding forces which hold the granule together. This increase in the strength of the cohesive forces in the granule thus results in the need for greater energy to disrupt the granule upon cooking such inhibited starch in water.

Inhibited granular starches are desired for various industrial uses. They are particularly useful in applications where the cohesiveness and stringiness of certain untreated starches are found to be objectionable. For example, in the food industry products yielding short, smooth pastes on cooking are used as thickening agents in pies, sauces and soups, etc.

It is often advantageous that the crosslinkages which are introduced into inhibited starch products should be labile, i.e. they should be readily destructible. Among the methods for destroying or eliminating these labile crosslinkages are treatments of the inhibited starches with heat, acids or bases, etc.

U.S. Pat. 2,461,139 teaches, inter alia, the use of linear polymeric anhydrides of polycarboxylic acids as well as the use of mixed anhydrides of carboxylic-polycarboxylic acids to produce labile ester crosslinkages in starch. Ester linkages in inhibited starches are of particular importance in that they are ordinarily stable at temperatures below 212° F. at pH levels of from about 4 to 7, but are destroyed at higher temperatures. However, there are several serious deficiencies to the procedures described in the abovementioned patent. Thus, the reaction of linear polymeric anhydrides of polycarboxylic acids with starch proceeds at a slow rate and is generally of poor yield. In the procedure employing mixed anhydrides of acetic polycarboxylic acids, the polycarboxylic acid and acetic anhydride are combined prior to their addition to the starch. The mixed anhydride is presumably formed on combining the reagents, and the mixture then reacts on addition to the starch base. Significant acetylation occurs as a side reaction in addition to the desired polycarboxylic ester formation. Furthermore, food products which incorporate the resultant starch product commonly exhibit poor taste characteristics after retorting which are largely due to the formation of acetic acid.

It is the prime object of this invention to provide a novel method for the preparation of inhibited starch products containing labile ester linkages so as to permit these linkages to be subsequently controllably and readily destroyed or eliminated, and whose presence permits these products to exhibit a combination of inhibited and normal swelling characteristics.

It is a further object of this invention to prepare inhibited starch products that are free of the undesired effects of non-crosslinked substitution onto starch, as for example, acetylation.

Various other objects and advantages of this invention will become apparent from the following description.

We have now found that we can prepare inhibited starch products containing labile ester crosslinkages by reacting starch bases with mixed carbonic-carboxylic anhydrides of polycarboxylic acids. These resultant inhibited starch products are characterized by their ability to be subsequently controllably and readily converted into more highly swollen products which are then comparable to starches which have not been treated with the mixed anhydride. Moreover, the process of this invention is normally carried out free of the deficiencies which are encountered with the procedures of the prior art.

The applicable starch base materials which may be used in preparing our crosslinked starch products may be derived from any plant source including corn, potato, sweet potato, wheat, rice, sago, tapioca, waxy maize, sorghum, high amylose corn or the like. Also included are the conversion products derived from any of the latter bases including, for example, dextrines prepared by the hydrolytic action of acid and/or heat; oxidized starches prepared by treatment with oxidants such as sodium hypochlorite; and, fluidity or thin boiling starches prepared by enzyme conversion or by mild acid hydrolysis. Our use of the term "starch base" is thus seen to include any amylaceous substances, whether untreated or chemically modified which, however, still retain free hydroxyl groups capable of entering into the crosslinking reaction of this invention. If the desired product is to be an inhibited, granular starch then obviously the initial starting material must be in granular form. It is to be noted that the process of our invention may also be carried out employing gelatinized starches which will result in the production of non-granular, crosslinked, starch products.

For the purposes of this invention, the term "a mixed carbonic carboxylic anhydride of a polycarboxylic acid" means a compound corresponding to the general formulas:

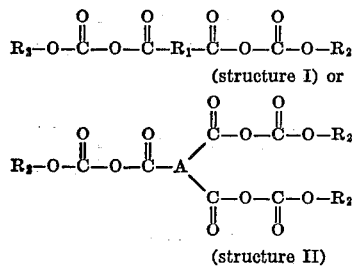

(structure I) or (structure II)

wherein $R_1$ is selected from the group consisting of alkylene, substituted alkylene, unsaturated alkylene, bisalkylene ether, cycloalkylene, arylene, and substituted arylene; $R_2$ is selected from the group consisting of alkyl, aryl, and aryl-alkyl; and, A is selected from the group consisting of trivalent paraffin radicals and trivalent substituted paraffin radicals wherein the paraffin moiety contains a maximum of 15 carbon atoms, and triavalent aromatic hydrocarbon radicals and trivalent substituted aromatic hydrocarbon radicals wherein the aromatic hydrocarbon moiety contains a maximum of 20 carbon atoms.

While the above structures define the compounds encompassed in the term "a mixed carbonic-carboxylic anhydride of a polycarboxylic acid" as used herein, it is to be noted that additional compounds which are analogous to the compounds of structure II but having more than 3 carboxylic groups attached to A may also be used to prepared the inhibited starches of this invention, if desired.

The above structures include within their definition some compounds which are not as desirable for use as others because of their poor stability and tendency to decompose. For example, the compounds wherein $R_1$ is equal to the ethylene radical, prepared from succinic acid, will ordinarily decompose almost immediately at room temperature making it ordinarily undesirable for this reason. Arylene compounds which have carboxyl groups on adjacent carbon atoms likewise exhibit a strong tendency to quickly decompose.

Suitable mixed carbonic-carboxylic anhydrides of a polycarboxylic acid corresponding to structure I may be prepared using dicarboxylic acids such, for example, as glutaric acid, adipic acid, pimelic acid, suberic acid, azelaic acid, sebacic acid, fumaric acid, 2,5-dimethyl adipic acid, cis-cyclohexane-1,2-dicarboxylic acid, trans-bicyclo [2.2.2] octane-2,3-dicarboxylic acid, trans-bicyclo [2.2.2] oct-5-ene-2,3-dicarboxylic acid, 1,14-tetradecanedicarboxylic acid, 1,10-decanedicarboxylic acid, diglycolic acid, 3,3'-oxydipropionic acid, biphenyl-4,4'-dicarboxylic acid, terephthalic acid, 2-bromobenzene-1,4-dicarboxylic acid, 2-chlorobenzene-1,4-dicarboxylic acid, isophthalic acid, naphthalene-1,4-dicarboxylic acid, naphthalene-1,5-dicarboxylic acid, nitroterephthalic acid, methylterephthalic acid, 1,3,5-hexatriene-1,6-dicarboxylic acid, and p-phenylenedipropionic acid.

Suitable mixed carbonic-carboxylic anhydrides of a polycarboxylic acid of structure II may be prepared using such tricarboxylic acids as pentane-1,3,5-tricarboxylic acid, benzene-1,3,5-tricarboxylic acid and citric acid.

The preparation of mixed carbonic-carboxylic anhydrides of a polycarboxylic acid is well described in the literature and is ordinarily carried out by reacting selected polycarboxylic acids, such as described hereinabove, with a chloroformate. A typical procedure for preparing these compounds is that of T. B. Windholz and J. B. Clements, J. Org. Chem. 29, 3021 (1964).

The novel process of this invention comprises the reacting of a selected mixed carbonic-carboxylic anhydride of a polycarboxylic acid, such as described hereinabove, with a desired starch base which is ordinarily suspended in water. Aqueous suspensions are preferred but the reaction may be carried out, if desired, in a non-aqueous system by suspending the starch base in any common inert organic solvent as, for example, p-dioxane, toluene, acetone, tetrahydrofuran, etc. The reaction of the mixed anhydride with the suspended starch is carried out at temperatures ranging from about 40 to 120° F. and preferably at 70 to 100° F. The pH of the system is ordinarily controlled so as to be above 6.5 but below about 10.5, with the preferred range being from about 7.0 to 9.0. With systems above pH 9, it is likely that the strongly basic medium will tend to hydrolyze the resultant starch derivative. The pH is conveniently controlled by the periodic addition of a dilute aqueous solution of sodium hydroxide, but other common bases, such as calcium or potassium hydroxide, tetramethylammonium hydroxide, and sodium carbonate, may be also used herein with equal success.

In one variation of the described method, the pH of the system is not controlled. In this variation an excess of base is added to the system without regard to pH, with the mixed anhdride being added and the reaction neutralized quickly thereafter. Use of systems wherein the pH is controlled is preferred, however.

The amount of mixed anhydride reagent used to react with the starch base may vary from about 0.05 to 100%, based on the dry weight of the starch, depending on such factors as the starch base employed, the degree of inhibition which is desired in the end product, and the particular anhydride reagent. However, from a practical aspect, anhydride concentrations of from about 0.1 to 3.0%, based on the dry weight of the starch, have been found to be sufficient, in most instances, to produce inhibited starch derivatives such as are ordinarily employed in food products. When anhydride concentrations of from about 3.5 to 100% are used, the resultant starch derivativies are highly inhibited. The mixed anhydride reagent may be employed either in its undiluted form or as a solution in any inert organic solvent, but preferably in one which is water miscible such, for example, as tetrahydrofuran, acetone or p-dioxane.

Reaction time will vary from 0.25 to 18 hours depending on such factors as the reactivity of the reagent used, the amount of reagent used, the temperature employed, etc. Reaction rates ordinarily decrease with mixed anhydrides of higher molecular weight. Completion of the reaction is noted by the absence of pH change in the system.

After completion of the reaction, the reaction mixture is preferably acidified to a pH of from about 5.0 to 7.0 using any common acid such as hydrochloric acid, sulfuric acid, acetic acid, etc. The resultant starch product is then recovered by filtration and washed free of residual salts with water, and is thereafter dried. If the organic by-products produced during the reaction are water insoluble, they can be removed by washing with alcohol or other suitable organic solvents. Alternatively, the washed product may be drum dried, or spray dried, or gelatinized and isolated by alcohol precipitation.

If desired, the inhibited starch products of this invention may also be prepared by means of a dry process. In carrying out a typical dry procedure the dry starch is first suspended in water and the slurry is adjusted to a pH of from about 8.0 to 11.8. The starch is thereafter dried, using any common means desired by the practitioner. The mixed carbonic-carboxylic anhydride is ordinarily diluted with a large excess of an inert organic solvent such, for example, as acetone, tetrahydrofuran or p-dioxane, and the solution is then sprayed onto the dry starch base which is thereafter heated (as by placing in an oven) at temperatures ranging from about 80 to 120° F. The reaction period (i.e. the heating time) will vary with such factors as the reactivity of the selected mixed carbonic-carboxylic anhydride which is employed, the selected starch base, etc. Reaction periods ranging from about 30 minutes to 6 hours have been found to be sufficient in most instances, however. At the end of the reaction period, the treated starch is allowed to cool. If removal of the salts and organic by-products is desired, then the starch is slurried in water. The pH of the slurry is adjusted to from about 5.0 to 7.0 and the starch product is recovered from the slurry by filtration, washed free of residual salts with water and isolated in a manner such as previously described above.

It is to be noted that a large number of variations may be effected in reacting the starch base with the mixed carbonic-carboxylic anhydride in accordance with either the wet or dry reaction procedure described above without materially departing from the general limitations set forth therein.

The resultant inhibited starch products of this invention are thus presumed to be crosslinked by ester linkages with the general reaction employing a mixed carbonic-carboxylic anhydride of structure I being represented as follows:

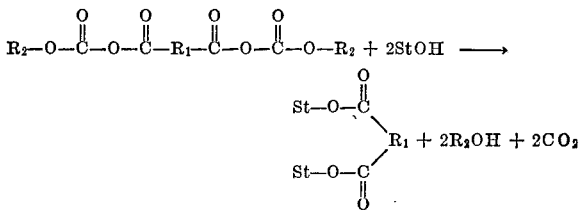

wherein St represents the starch and $R_1$ and $R_2$ are as described hereinabove.

The inhibited starch products of this invention are characterized by their ability upon cooking to initially yield thin low viscosity dispersions which can be subsequently thickened to high viscosities by the destruction of their labile crosslinkages, thereby leading to the further swelling and possible rupture of the starch granules. As previously noted, the crosslinkages of these starch products may be readily destroyed by heat at temperatures above the boiling point of water. The temperature at which complete loss of inhibition occurs can be controlled by the level of ester substitution, depending upon the extent of reaction and the consequent amount of ester crosslinkages produced, and is affected by pH and retort time. Selected properties of the starch dispersion after retorting, i.e. heating under pressure, can be further controlled by the choice of the base starch.

The inhibited starch products of this invention are particularly useful in the food industry where they may be employed as thickeners for pies, sauces and soups, baby foods, etc. They are of particular interest in the canning industry as a result of their unique behavior during retorting of the canned food products. In this procedure, the crosslinkages of the inhibited starch products of this invention are initially intact and the starch dispersion is in a thin state, thereby enabling the heat utilized for sterilization of the food product to rapidly penetrate the can and its contents. The continued application of heat, however, serves to subsequently destroy the crosslinkages of the inhibited starch thickeners thereby activating their delayed thickening properties to produce desirable high viscosity dispersions. A practical advantage of these inhibited starch products is derived from the fact that they are capable of having their crosslinkages destroyed at pH levels which range from about 2.0 to 8.0, the usual pH levels of canned foods. It has been found that upon retorting of these starches in various systems, low pH systems will tend to retard the rate of destroying the cross-linkages while higher pH systems will tend to accelerate this process.

The inhibited starch products described herein also find use as temporary suspending agents, and in various coating, sizing and adhesive applications. In addition, these starch products may also find use as dusting powders for surgical and cosmetic purposes.

In the following examples, which further illustrate the embodiment of this invention, all parts given are by weight unless otherwise specified.

EXAMPLE I

This example illustrates the preparation of inhibited starch products of this invention as well as the viscosity characteristics of a chicken gravy derived therefrom.

A total of 1,000 parts of waxy maize starch was suspended in 1500 parts of water at room temperature and the pH adjusted to 8.0 with a 3% aqueous solution of sodium hydroxide. The starch suspension was stirred and 6.4 parts of bis (ethylcarbonic) adipic anhydride was added slowly over a thirty minute period. A pH of 8.0 was maintained by the addition of 3% sodium hydroxide at periodic intervals during the entire reaction. The reaction was complete after three hours, at which point there was no further change in pH. The pH was then lowered to 6.5 with 6 N sulfuric acid and the product recovered by filtration. The product was washed three times with water to remove salts, and dried.

In this manner, an inhibited waxy maize was also prepared using 10.2 parts of bis(ethylcarbonic)adipic anhydride.

In a series of experiments 60.6 parts of chicken broth (fat removed), 3.2 parts of chicken fat, 30.2 parts of water, and 6.0 parts of an inhibited starch product, as described above, were combined and cooked at 190° F. for a period of thirty minutes. Water lost by evaporation was replaced in order to keep a constant weight. The pH of the food system was approximately 6.0.

Each of the gravy mixtures was very thin after the initial cook at 190° F., and the Bostwick viscosity was measured. Each of the gravy mixtures, respectively thereafter, was poured into conventional #2 cans, which were then sealed in the usual manner. The filled cans were retorted at 245° F. for three hours and the Bostwick viscosity of each dispersion was measured after cooling the retorted sample to 72° F. The table below summarizes the data obtained.

TABLE I

| | Bostwick viscosity [1] | |
|---|---|---|
| | Sample A | Sample B |
| Starch dispersion cooked 190° F. for 30 minutes. | >24 inches in 3.7 seconds. | >24 inc e seconds. |
| Starch dispersion retorted 245° F. for 3 hours and then cooled to 72° F. | 1.5 inches in 1 minute. | 1.0 inches in 1 minute. |

[1] Sample A was treated with 0.64% bis(ethylcarbonic) adipic anhydride and Sample B was treated with 1.02%.

Bostwick viscosity is measured in terms of the distance which a sample flows on an inclined plane. The greater the distance traveled, the lower the viscosity.

The above data clearly illustrate that the crosslinkages of these inhibited starches can withstand cooking at 190° F., but are destroyed by retort temperatures.

EXAMPLE II

This example illustrates the preparation of additional inhibited starch products of this invention wherein potato starch is treated with 2.0% of bis(ethylcarbonic) fumaric anhydride, based on the weight of the starch.

The procedure used herein to inhibit the starch was identical to that described in Example I except that the starch base was potato starch and the mixed anhydride was bis(ethylcarbonic) fumaric anhydride. A total of 15 parts of the thus-prepared starch derivative and 270 parts of a pH 6.07 maleic acid buffer solution were placed in eight ounce cans. The filled cans were then heated in a water bath at 212° F. for 20 minutes, after which the viscosity of the starch solution was measured. The cans were retorted in a glycol bath maintained at 255° F. while being mechanically tumbled. The cans were removed after 15 minutes, rapidly cooled to room temperature, and the viscosities of their contents were measured with a Brookfield RVF viscometer employing the indicated spindle at 10 r.p.m. The above procedure was repeated except that the temperature of the glycol bath was lowered to 240° F. The table below summarizes the data obtained.

TABLE

| | Brookfield viscosity, cps. | Spindle number |
|---|---|---|
| Starch dispersion cooked at 212° F. for 20 minutes | 1,950 | 4 |
| Starch dispersion retorted at 240° F. for 15 minutes | 28,000 | 5 |
| Starch dispersion retorted at 255° F. for 15 minutes | 36,000 | 5 |

The above data, likewise show the crosslinkages of these inhibited starch products to withstand cooking at temperatures of 212° F. and unable to withstand temperatures of 240–255° F.

EXAMPLE III

This example illustrates the preparation of additional inhibited starches typical of the starch products of this invention.

The procedure used in preparing these starches was essentially identical to that described in Example I except that the waxy maize used therein was replaced, respectively, by untreated potato starch and corn starch which had previously been acetylated with 5.0% of acetic anhydride. The concentration of bis(ethylcarbonic) adipic anhydride used was 0.67% with the corn starch and 0.50% with the potato starch, based on the weight of each starch base, respectively. Aqueous dispersions were prepared from each of the thus-inhibited starches, and in each case the dispersion, after cooking at 212° F. for about 20 minutes (pH 7), was very thin indicating an effective inhibition of the starch.

In a repetition of the above procedure, additional inhibited starch products were prepared wherein untreated waxy maize, identical to that employed in Example I, was treated with various mixed bis(ethylcarbonic) carboxylic anhydrides which were prepared respectively from terephthalic acid, 2,5 dimethyl adipic acid, 1,12-dodecandicarboxylic acid, and docosane-1,22-dioic acid. The mixed anhydrides of these acids were employed in concentrations ranging from about 0.2 to 2.5%, based on the weight of the starch. Cooked dispersions of each of these inhibited starches (212° F. for about 20 minutes) showed a marked lower viscosity, and less clarity and cohesiveness as compared to control dispersions which had been prepared using the identical untreated waxy maize starch base, but had not been reacted with the mixed anhydride.

EXAMPLE IV

This example illustrates the preparation of additional inhibited starch products of this invention employing an untreated waxy maize and tapioca starch base.

In a repetition of the procedure described in Example I, waxy maize was reacted with 3.45%, by weight, of bis(benzylcarbonic) adipic anhydride, 2.1% of bis(ethylcarbonic) fumaric anhydride, or 7.2% of the tris(ethylcarbonic) carboxylic anhydride derived from pentane-1,3,5-tricarboxylic acid, respectively. Cooked dispersions (212° F. for 20 minutes) of each of these inhibited starches were very thin and settled indicating an effective inhibition of starch.

Untreated waxy maize was also reacted with 0.9%, by weight, of tris(ethylcarbonic) citric anhydride. A cooked dispersion of the product showed a marked lower viscosity, and less clarity and cohesiveness as compared to a control dispersion which had been prepared using identical untreated starch base.

In a repetition of the above procedure, a tapioca base was reacted with 2.0%, by weight, of bis(ethylcarbonic) fumaric anhydride. A cooked dispersion of the resultant product (212° F. for 20 minutes) was very thin and settled indicating an effective inhibition of the starch.

EXAMPLE V

This example illustrates the preparation of a highly inhibited starch product of this invention.

The procedure used herein was identical to that described in Example I except that the concentration of bis(ethylcarbonic) adipic anhydride employed was increased to 1,000 parts. The resultant product was highly inhibited and would not suspend when cooked at 212° F. at pH 7.0, settling to the bottom almost immediately.

EXAMPLE VI

This example illustrates the preparation of an inhibited starch product of this invention by means of a dry procedure.

About 200 parts of waxy maize was pretreated by suspending the starch in 300 parts of water containing 1.6 parts of sodium hydroxide and stirring for a period of 15 minutes. (The pH of the suspension was found to be 11.8.) The suspension was thereafter filtered and the starch was air dried to have a moisture content of about 17%. A solution of bis(ethylcarbonic) adipic anhydride (0.5 gram in about 10 milliliters of acetone) was sprayed onto 50 grams of the previously treated waxy maize. The sprayed starch was then placed in an oven set at a temperature of 45° C. for a period of five hours, after which time the starch was cooled and poured into 100 milliliters of water. The pH of this suspension was adjusted to 6.5 with dilute sulfuric acid, and the starch was recovered by filtration, washed three times with water and air dried.

A cooked dispersion of this inhibited starch exhibited a marked lower viscosity, and less clarity and cohesiveness, as compared to a control dispersion which had been prepared using the identical starch base which, however, had not been reacted with the mixed anhydride.

EXAMPLE VII

This example illustrates the use of various bases to control the pH during the preparation of inhibited starch products of this invention.

The procedure used herein to inhibit the starch was identical to that described in Example I except that 50 parts of waxy maize were reacted with 0.2 part of bis-(ethylcarbonic) adipic anhydride and the pH was maintained at 8.0 with 3% aqueous sodium carbonate or solid calcium hydroxide. Cooked dispersions (212° F. for 20 minutes) of both products were very thin, indicating effective inhibition.

EXAMPLE VIII

This example illustrates the preparation of inhibited starch products of this invention at various temperatures.

In a repetition of the procedure of Example I, two portions of waxy maize were reacted with 0.4%, by weight, of bis(ethylcarbonic) adipic anhydride at 10° C. and 0.3%, by weight, of bis(ethylcarbonic) adipic anhydride at 40° C., respectively. Cooked dispersions (212° F. for 20 minutes) of each product were both very thin, indicating effective inhibition.

EXAMPLE IX

This example illustrates the preparation of inhibited starch products of this invention at different pH's.

In a repetition of the procedure of Example I, waxy maize was reacted with 0.6%, by weight, of bis(ethylcarbonic) adipic anhydride at controlled pH levels of 7.0, 8.0, 9.0, and 10.0. Cooked dispersions (212° F. for 20 minutes) of these products showed a marked lower viscosity and less clarity and cohesiveness as compared to a control dispersion which had been prepared using identical untreated starch base. The pH 8.0 and 9.0 products were very thin, indicating more efficient reaction than the pH 7.0 and 10.0 reactions.

EXAMPLE X

This example illustrates the preparation of a non-granular, crosslinked, starch product prepared using a previously gelatinized starch base.

About 100 parts of an acid hydrolyzed waxy maize (85 fluidity) was suspended in 400 parts of water. The suspension was heated on a boiling water bath for 20 minutes and then cooled to about room temperature, and the pH of the thus-gelatinized starch was adjusted to 8.0 with dilute sodium hydroxide. Thereafter, the cooled starch suspension was stirred and 1.0 part of bis(ethylcarbonic) adipic anhydride was added thereto over a period of 30 minutes. A pH of 8.0 was maintained during the entire reaction period.

The reaction mixture exhibited a significant increase in viscosity indicating crosslinking of the starch had taken place.

EXAMPLE XI

This example illustrates the preparation of inhibited starch products of this invention utilizing a non-aqueous solvent system.

A total of 50 parts of waxy maize starch was suspended in 100 parts of p-dioxane containing 0.5 part of tetramethylammonium hydroxide, The starch suspension was stirred at room temperature and 0.4 part of bis(ethylcarbonic) adipic anhydride was added dropwise. After addition was complete, the starch suspension was stirred for one hour and then poured into 200 parts water. The pH was lowered to 6.5 with 6 N sulfuric acid and the starch product recovered by filtration. The product was washed three times with water to remove salts and dried.

A cooked dispersion of the resultant product (212° F. for 20 minutes) showed a marked lower viscosity, and less clarity and cohesiveness as compared to a control dispersion which had been prepared using identical untreated starch base.

EXAMPLE XII

In still another repetition of the procedure described in Example I, 1,000 parts of waxy maize were treated with 0.5 part of bis(ethylcarbonic) adipic anhydride. A cooked dispersion of the starch (212° F. for 20 minutes) was substantially less cohesive than that of a corresponding untreated starch.

Summarizing, it is seen that this invention provides a means for obtaining inhibited, granular starch derivatives crosslinked by labile ester linkages. Variations may be made in materials proportions and procedures without departing from the scope of this invention as defined by the claims.

We claim:

1. A method for the preparation of an inhibited starch derivative which consists in reacting an ungelatinized starch with a mixed carbonic-carboxylic anhydride of a polycarboxylic acid selected from the group consisting of:

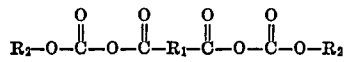

and

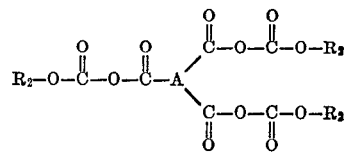

wherein $R_1$ is selected from the group consisting of alkylene, substituted alkylene, unsaturated alkylene, bis-alkylene ether, cycloalkylene, arylene, and substituted arylene; $R_2$ is selected from the group consisting of alkyl, aryl, and aryl-alkyl; and, A is selected from the group consisting of trivalent paraffin radicals and trivalent substituted paraffin radicals wherein the paraffin moiety contains a maximum of 15 carbon atoms, and trivalent aromatic hydrocarbon radicals and trivalent substituted aromatic hydrocarbon radicals wherein the aromatic hydrocarbon moiety contains a maximum of 20 carbon atoms, in an aqueous medium having a pH of above about 6.5 but below about 10.5, said reaction being carried out at temperatures ranging from 40 to 120° F. for periods ranging from 0.25 to 18 hours, and recovering the resulting inhibited starch.

2. The method of claim 1, in which the mixed anhydride in the reaction is present in the concentration of from about 0.05 to 100%, based on the weight of the starch.

3. The method of claim 1, in which the water is replaced with an inert, organic solvent.

4. The method of claim 1, in which the mixed anhydride is bis(ethylcarbonic) adipic anhydride.

5. The method of claim 1, in which the mixed anhydride is bis(ethylcarbonic) fumaric anhydride.

6. A method for the preparation of an inhibited starch derivative comprising:
(a) mixing an ungelatinized starch, which has been pretreated with alkali such that it has a pH between 8.0 and 11.8 when measured as a 40% solids, by weight, aqueous slurry, with a mixed carbonic carboxylic anhydride of a polycarboxylic acid as defined in claim 1;
(b) heating said starch at a temperature of from about 80 to 120° F. for a period ranging from 0.5 to 6 hours; and
(c) recovering said starch.

References Cited
UNITED STATES PATENTS

| | | | |
|---|---|---|---|
| 2,461,139 | 2/1949 | Caldwell | 260—234 |
| 2,868,781 | 1/1959 | Gaertner et al. | 260—234 |
| 2,891,947 | 6/1959 | Paschall et al. | 260—233.5 |
| 3,238,193 | 3/1966 | Tuschhoff et al. | 260—233.5 |
| 3,284,442 | 11/1966 | Jarowenko et al. | 260—233.5 |

FOREIGN PATENTS

| | | | |
|---|---|---|---|
| 724,149 | 12/1965 | Canada | 260—233.3 |

DONALD E. CZAJA, Primary Examiner

M. I. MARQUIS, Assistant Examiner

U.S. Cl. X.R.

99—144; 260—233.3 R